United States Patent [19]

Sidebotham et al.

[11] 4,003,881
[45] Jan. 18, 1977

[54] POLYESTER POLYMER RECOVERY FROM DYED POLYESTER FABRICS

[75] Inventors: Norman C. Sidebotham, Decatur, Ala.; Paul D. Shoemaker; Clarence W. Young, III, both of Pensacola, Fla.

[73] Assignee: Monsanto Company, St. Louis, Mo.

[22] Filed: Feb. 24, 1975

[21] Appl. No.: 552,839

[52] U.S. Cl. .............................. 260/75 T; 264/37; 264/49; 264/344

[51] Int. Cl.$^2$ .................... D06M 9/00; C08G 63/70

[58] Field of Search ............ 260/75 T, 2.3; 264/37, 264/49, 344

[56] References Cited

UNITED STATES PATENTS

| | | | |
|---|---|---|---|
| 2,938,811 | 5/1960 | Hermes | 260/75 T X |
| 3,159,964 | 12/1964 | Kretsch | 260/75 T |
| 3,716,614 | 2/1973 | Okamoto et al. | 264/344 |
| 3,943,105 | 3/1976 | Hermes | 260/75 T X |

Primary Examiner—Lucille M. Phynes
Attorney, Agent, or Firm—Thomas Y. Awalt, Jr.

[57] ABSTRACT

Polyester polymer is recovered from polyester fibers (in the form of filaments, yarns or fabrics and the like, both dyed and undyed), and used in the production of new undyed fibers, films, and other polymer products through the process of: stripping the dye from the dyed polyester fibers by contacting the fibers with a dye-stripping solvent for polyester polymer at a temperature below which the polyester fibers dissolve and above which the crystalline lattice of the polyester fibers swell so as to release the dye; then removing essentially all of the dye-containing dye-stripping solvent which is not absorbed by the fibers and fabrics; then contacting the wet solvent-laden fibers, possibly containing residual dye, with sufficient addition of a dissolution solvent under dissolution conditions for polyester fibers; thereafter precipitating the polyester out of; and, separating the polyester from the solution.

12 Claims, No Drawings

POLYESTER POLYMER RECOVERY FROM DYED POLYESTER FABRICS

BACKGROUND OF THE INVENTION

1. Field of the Invention

The invention relates to a process for recovering thermoplastic polymers, and particularly linear polyester polymers from polyester fibers or other linear polymeric products in the form of collections of polyester fibers, yarns, or fabrics, including dyed polyester fibers, and preferably starting with waste polyester fabrics, for use in production of new undyed thermoplastic polyester products. More specifically, the invention relates to a process for recovering polyester polymer by means of stripping the dye from dyed polyester fibers, subsequently dissolving the polyester fibers; thereafter precipitating out the polyester polymer for reuse.

2. Prior Art

The consumption of thermoplastic polymers is greater than ten billion pounds per year. Some, such as polyethylene, polypropylene, polyvinylchloride, polystyrene, polyamides and polyester, surpass the billion pounds per year rate. The use of many of these relatively expensive thermoplastic polymers in synthetic fibers has also increased tremendously. It has been estimated that the world's consumption of synthetic fibers will reach some 12 million metric tons (26 billion pounds) by the year 1980, of which 4.6 million metric tons would constitute polyester fibers, 4.1 million metric tons would be polyamide fibers and 2.3 million metric tons will be polyacrylic fibers (*Chemical and Engineering News*, Feb. 2, 1970, p. 22).

Concomitantly the world is facing a shortage of raw materials for thermoplastic polymers; and sophisticated and efficient methods of recycling are needed.

Various methods have been described in the prior art for the recovery of thermoplastic polymer, including polyester polymers, from scrap polymer; and these include the dissolution of the polymer in various solvents; thereafter precipitating and recovering the polymer. The objects of such processes were to avoid polymer degradation and/or to separate from the usable polymer the degraded polymer and/or monomers as impurities. These processes were slow and expensive; suitable only for laboratory usage; moreover, they neither addressed themselves to nor did they solve dye removal problems.

Waste fibers, films, yarns and fabrics have also been garnetted and reprocessed for various uses including the manufacture of yarn and fabrics.

Neither the prior art fabric recovery processes nor the polymer recovery processes have provided for efficient dye stripping in conjunction with polymer recovery, and most have not addressed the problem.

It will thus be recognized that a satisfactory and efficient process for recovery of polyester polymer from polyester polymer, fibers or fabric, would be a meritorious advance in the art. It would substantially reduce the raw material requirement for the world's largest fiber market.

SUMMARY OF THE INVENTION

In accordance with the present invention, a totally new process is provided whereby dye stripping and polymer recovery are combined in such a manner that the dye stripping step actually constitutes the first step of the dissolution step in that after completion of the so-called "dye stripping" step the fibers retain some absorbed dye-stripping solvent which serves as part of the solvent used for dissolution of the polyester, so that only one solvent system may be employed. Moreover, the dissolution of the polyester and its subsequent precipitation and separation from the solvent serves to complete the dye removal, as well as the recovery of the polymer.

Briefly, the inventive concept is a process for recovering polyester polymer from dyed polyester fibers or fabrics comprising:

1. stripping the dye from polyester fabrics or fibers by contacting the dyed polyester fabrics or fibers with a dye-stripping solvent for polyester polymer at a temperature below which the polyester fiber is dissolved and above which the crystalline lattice of the polyester fibers swell so as to release the dye;
2. then removing essentially all of the dye-containing solvent which is not absorbed by the fibers or fabrics;
3. then contacting the wet solvent-laden fibers or fabric possibly containing residual dye, with sufficient addition of primary dissolution solvent under dissolution conditions for polyester fibers;
4. then precipitating the polyester out of; and,
5. separating it from the solution.

It is an advantage of this invention that the same solvent or solvent system may be used for both dye stripping and polymer recovery.

It is another advantage of this invention that solvent removal problems are thus greatly simplified.

It is yet another advantage of this invention that preferred solvent systems are employed efficiently and rapidly in the recovery process.

DESCRIPTION OF THE PREFERRED EMBODIMENTS

For the purposes of this description, solvents will be classified as "dye-stripping solvents" and "primary dissolution solvents". A "dye-stripping solvent", as used herein, is any solvent which swells the crystalline structure of the polyester fiber, at the same time dissolving and thereby removing conventional dyes and finishes. A "primary dissolution solvent" is a solvent whose primary function in the course of this invention is to dissolve the polyester. Preferably it will be capable of dissolving a significant amount of polyester, at moderate temperatures, all the while permitting precipitation at a later stage at another moderate temperature. All presently known "primary dissolution solvents" are also "dye-stripping" solvents, but the converse is not necessarily true. Of course it is preferred, according to this invention, that the dye-stripping solvent and the primary dissolution solvent be the same, and such identity is one aspect of the instant invention. If identical solvents are not used, it is desirable that they be compatible, in the sense that they do not functionally interfere with one another and they are readily separable or functionally interchangeable, as this will permit a much more simplified recovery system. It is also preferred that the solvents employed in this invention do not significantly degrade or depolymerize the polyester.

Suitable dye stripping solvents include most of the so-called "polyester dye carriers". It is well known, for example, that most of the following compounds will cause an increase in the diameter of the polyester fiber immersed therein: phenol, meta-cresol, tetrahydronaphthalene, orthophenylphenol, para-phenylphenol, and such compounds may be employed as either dye stripping solvents or primary dissolution solvents or both. Other known solvents and solvent systems for polyester which may be employed for both dye removal and dissolution include para-chloroanisole; nitrobenzene; acetophenone; propylene carbonate; dimethyl sulfoxide; tetrachloroethane; 2,6 dimethyl phenol; quinoline; trifluoracetic acid, orthochlorophenol, trichlorophenol, and mixtures of trichloroethane and phenol; trichloroacetic acid and dichloromethane, trichloroacetic acid and 1,1,1 trichloroethane; trichloroacetic acid and water; trichlorophenol and phenol; 1,1,2,2 tetrachloroethane and phenol; 1,2,2 trifluoroethane and 1,1,1,3,3,3 hexafluoro-isopropanol; ethylene carbonate and propylene carbonate; acetophenone and para-chloroanisole; 2,6 dimethyl phenol and chloroform; and 2,6 dimethyl phenol and carbon tetrachloride. Other known polyester solvents and solvent systems which are useful include compounds having at least one and more commonly two or more unsaturated rings in their structure such as diphenyl, diphenyl ether, naphthalene, methylnaphthalene, benzophenone, diphenylmethane, para-dichlorobenzene (above 174° C), acenaphthene, phenanthrene and similar compounds. Naphthalene has been found especially suitable for the practice of this invention for dye stripping and primary dissolution solvent because the solubility of polyester in naphthalene is a strong function of temperature, ranging from negligible solubility at 170° C to 55 percent polyester solubility at 218° C (boiling point of naphthalene). To a greater or lessor extent all of the above may be employed as "dye-stripping solvents" as well as "primary dissolution solvents" for polyester in accordance with this invention.

From the point of view of dye stripping, the following solvents or solvent systems have been found to be especially effective 1. a 95% dichloromethane/5% trichloroacetic acid solution;
2. dimethyl formamide at temperatures above 80° C;
3. naphthalene at temperatures between 80° C and 170° C;
4. benzyl alcohol, with extraction at about 136° C, although this solvent tended somewhat to dissolve the polyester as well as the dye;
5. a 44 percent benzyl alcohol/56 percent ethylene glycol azeotropic composition;
6. a 50% naphthalene/50% benzyl alcohol solution.

The preliminary dye removal may be accomplished by any method of immersing or otherwise intimately contacting and agitating a fiber or fabric collection with the dye-stripping solvent, in any manner which produces a net reduction of final dye concentration in the fiber or fabric collection. Any one of the following methods may be used to accomplish the preliminary dye removal. Although the starting material is described as "fabric" or "fabric collection", it should be construed in the broadest sense to include "fibers" as hereinafter defined.

1. Contacting a batch of fabric with a large amount of dye-stripping solvent, which quantity is large enough to dilute the dye concentration in the fabric to the desired level.
2. Contacting a batch of fabric with dye-stripping solvent. The dye-containing solvent is agitated if desired and continuously removed and replaced with fresh or relatively dye-free dye-stripping solvent, in sufficient quantity to reduce the fabric's dye concentration to the desired level.
3. Contacting a batch of fabric with fresh or relatively dye-free dye-stripping solvent, using agitation if desired, for a certain batch contact time; thereafter removing substantially all of the dye-containing solvent and contacting the fabric with fresh or relatively dye-free dye-stripping solvent, with agitation if desired, for some period of contact time which may differ from the original or subsequent batch contact times; thereafter repeating as many times as desired such dye-stripping solvent addition, fabric contacting, and solvent removal, in order to obtain the desired degree of dye removal from the fabric. (This method is substantially equivalent to the laboratory Soxhlet extractor.)
4. Fabric or a fabric collection is continuously moved along a path or conduit in one direction while simultaneously being contacted with a dye-stripping solvent, which solvent is more or less continuously flowing in a direction opposite to the movement of the fabric. Fresh or relatively dye-free dye-stripping solvent is added in a manner which maintains a relatively continuous flow of the dye-stripping solvent, and the dye-containing dye-stripping solvent is more or less continuously removed at or near the place where the fabric or fabric collection is first contacted with the dye-stripping solvent.
5. Fabric or a fabric collection is successively contacted with dye-stripping solvent in a multiplicity of dye-stripping solvent contact stages, with said contact stages arranged in such a manner that each subsequent contact stage reduces the dye concentration in the fabric collection; especially a countercurrent flow arrangement of contact stages, in which fresh or relatively dye-free dye-stripping solvent is added only to the final fabric contact stage, with a more or less equal amount of dye-containing dye-stripping solvent removed from the final stage and added to the dye-stripping solvent in the next-to-final contact stage, such counter-current flow replenishment continued for as many contact stages as are used, with the dye-laden dye-stripping solvent removed from the first fabric contact stage.

Of course, in these dye-stripping solvent contacting processes, the fabric or fabric collection may be added to the dye-stripping solvent, or the dye-stripping solvent may be added to the fabric or fabric collection. Similarly, of course, the fabric may be moved through dye-stripping solvent which is kept more or less in one place; or the fabric may be held more or less at one place while the dye-stripping solvent is moved into contact with and subsequently removed from the fabric or fabric collection; or, both the fabric and dye-stripping solvent may be moved simultaneously or alternately.

For efficient dye stripping without polymer loss, the temperature of the dye-stripping solvent during the dye stripping phase must be below the temperature at which there is significant dissolution of the polyester fibers. However, it is well known among textile dyeing and finishing experts that most efficient dye stripping of polyester fibers will occur at the highest temperature practical because swelling of the crystalline lattice of the polyester is greatest at the higher temperatures. A significantly lower temperature will decrease swelling of the fiber, and at just above the freezing or solidification point of the solvent, there will be little or no dye stripping. Preferred, therefore, is the highest temperature below which there is significant dissolution of the polyester.

Apparatus or equipment which may be used for the preliminary dye removal operation include tanks or vats, which may be agitated or not agitated, whether open top or covered or sealed to hold pressure or vacuum; bowl-type washing machines; centrifugal filters, with or without provisions for solvent rinsing or continuous or intermittent removal of fabric; continuously or intermittently moving conveyor belts passing through solvent-contacting zones; screw conveyor devices; and solvent spraying devices.

When the preliminary dye stripping step is completed, and the dye-containing dye stripping solvent is removed, the remaining wet fabric or collection of fabrics containing residual dye and solvent is contacted with sufficient additional relatively dye-free primary solvent under dissolution conditions for the polyester fibers. Of course, the residual dye-containing solvent-laden fabric may be added to the primary solvent, or the primary solvent may be added to the fabric. As previously mentioned, the additional primary dissolution solvent may or may not be the same solvent or solvent system as employed for dye stripping; but it is preferable to use the same solvent or solvent system for process efficiency, simplicity, and economy. A recycling system is much preferred over a non-recycling system; and it might well be essential to the commercial feasibility of the process. Incompatible solvents or solvent systems would add to the complexity and cost of any such recycling.

When the polyester fibers have dissolved, the solution may be filtered if desired to remove any undissolved impurities.

Precipitation and separation may be accomplished by any convenient means, but it has been found that a shock quenching and solution spinning are preferred methods.

Shock quenching may be accomplished by subjecting the solution to a quenching medium, preferably in the form of a liquid which is preferably a solvent for the primary dissolution solvent. For example, a naphthalene solution may be shock quenched with dimethyl formamide, 1,1,1 trichloroethane, acetone, or dichloromethane, this method having the advantage that should the quenching solvent lower the temperature of the naphthalene to a point where it would ordinarily solidify, the quenching solvent would keep the naphthalene in liquid phase. Of course, in the case of naphthalene, polyester will precipitate from solution at a higher temperature than that at which naphthalene solidifies; and therefore quenching may be done with a non-solvent for naphthalene. Water, for example, has been successfully employed as a quenching material for the polyester solution.

If desired, the polyester solution may be spun directly to a fiber with simultaneous drawing during the fiber-forming process (if advantageous). The primary solvent may be either removed from the fiber during the fiber-forming process ("solution spinning"), or removed by washing the fiber with a suitable solvent some time after spinning is completed, and (where desirable) the primary solvent may even be removed after suitable drawing of the fiber. The solution spinning process is particularly advantageous, since the quenching medium provides simultaneous precipitation of polymer from solution, separation of primary solvent and dyes from the polyester, and formation of the polyester into fiber.

A polyester is defined as synthetic linear condensation-type polymer whose repeating units contain the ester group,

these groups being integral members of the linear polymer chain. Polyesters may be those derived from aliphatic dibasic acids such as oxalic, succinic, glutaric, adipic, and sebacic acids and glycols such as ethylene glycol, propylene glycol, trimethylene glycol, hexamethylene glycol and decamethylene glycol. Polyesters may also be derived from aromatic dicarboxylic acids such as terephthalic acid and isophthalic acid and glycols such as ethylene glycol. Polyesters may also be derived from hydroxy acids and their corresponding lactones such as those from hydroxypivalic acid, alpha-hydroxyisobutyric acid, omega-hydroxycaproic acids, omega-hydroxydecanoic acids, γ-butyrolactone and 4-hydroxyhexanoic acid lactone. Polyesters as used herein include copolymers containing repeating units of two or more different kinds such as copolyesteramide provided that at least two-thirds of the repeating units are the abovedefined ester linkages.

Representative examples include poly(ethylene terephthalate), poly(trimethylene terephthalate), poly(tetramethylene terephthalate), poly(ethyleneisophthalate), poly(octamethylene terephthalate), poly(decamethylene terephthalate), poly(pentamethylene isophthalate), poly(tetramethylene isophthalate), poly(hexamethylene isophthalate), poly(hexamethylene adipate), poly(pentamethylene adipate), poly(pentamethylene sebacate), poly(hexamethylene sebacate), poly(1,4-cyclohexylene adipate), poly( 1,4-cyclohexylene sebacate), poly(ethylene terephthalate-co-sebacate), and poly(ethylene-co-tetramethylene terephthalate).

Unless otherwise indicated, the term "polyester fibers", as used herein to describe the starting material which is subjected to dye stripping and recovery in accordance with this invention, includes polyester filaments, monofilaments, bands, ribbons, tubes, films and other linear constructions and includes yarns, threads, fabrics and other products into which these constructions may be incorporated as well as common impurities associated with such products, new or old.

EXAMPLES

Example 1 (Dye Stripping only)

Dichloromethane and 1,1,1-trichloroethane, each containing 5% trichloroacetic acid were employed in the countercurrent dye removal process generally described in numbered paragraph 5 above. Good dye removal was achieved at ambient temperatures. It was observed that increase of the acid concentration to 15–20% trichloroacetic acid resulted in a stiffening and partial dissolution of the polyester fabric. As the temperature was increased, dye extraction was much more effective.

Example 2 (Dye Stripping only)

At a temperature of 25° C, using 5% trichloroacetic acid in dichloromethane, in the same dye stripping procedure as employed in Example 1, it was found that six wash stages required a solvent dilution weight (in terms of units of wash solvent) to polyester weight (in terms of units of polyester) of about 8 to effect complete dye removal.

Example 3 (Dye Stripping only)

Employing dimethyl formamide in the same countercurrent dye stripping process at a temperature of 150° C, it was found that after six wash stages, the ratio of the solvent dilution weight to the weight of polyester was only about 4, reflecting very effective dye removal.

Example 4 (Dye Stripping only)

Ethylene glycol was employed as the dye stripping solvent in the same process at a temperature of 190° C with relatively poor results. At six wash stages, the ratio of solvent dilution weight to polyester weight was about 15. It was also observed that depolymerization occurs if the temperature is raised much above 200° C.

Example 5 (Dye Stripping only)

Naphthalene was employed as the dye stripping solvent in the same process at a temperature of 160° C. At the completion of six wash stages, the ratio of solvent dilution weight to polyester weight was about 8. It was observed that at temperatures above 170°, naphthalene dissolves a substantial amount of polyester. It was also observed that naphthalene can be washed off the dye-stripped polyester with 1,1,1-trichloroethane, dichloromethane, or acetone.

Example 6 (Polyester Recovery only)

A sample of fabric composed of polyethylene terephthalate fibers was dissolved at 10% polymer concentration in naphthalene at 210° C. The solution was placed under vacuum at 110° C for 2 hours, and a fine white powder of polyethylene terephthalate was obtained. Residual naphthalene was rinsed off with 1,1,1-trichloroethane. The intrinsic viscosity of the recovered powder was compared with the intrinsic viscosity of the original sample, and the results are shown in the following table:

TABLE 1

| Intrinsic Viscosity of Original Sample | Intrinsic Viscosity of Recovered Powder |
|---|---|
| 0.6031 | 0.6045 |
| 0.6145 | 0.6074 |

Example 7 (Dye Stripping only)

The following solvents were evaluated for dye removal of polyester generally according to the process described at paragraph No. 3 above, employing a Soxlet extractor:

TABLE II

| System Composition | Comments |
|---|---|
| 46% ethylene glycol + 54% naphthalene (Azeotropic composition) | After 8 washes, brown and black polyester still |
| Boiling point 184° C. Benzyl alcohol Boiling point 207° C (Actual extraction temperature 136° C). | pale dull green. After 4 washes, all samples were white or off-white. Tended to dissolve the polyester. |
| 44% benzyl alcohol +56% ethylene glycol (Azeotropic composition) Boiling point 195° C. | Good dye removal. After 5 washes, all PET samples white or off-white. |
| 1:1 benzyl alcohol and naphthalene, Boiling point 206° C. | After 10 washes, all samples were white or off-white. |
| Triethyl phosphate Boiling point 214° C. | Very poor dye removal. |

Example 8 (Polyester Recovery only)

Solutions of polyethylene terephthalate in naphthalene were prepared as above at polymer concentrations of 10%. One solution was permitted to cool to room temperature rapidly, and the other was cooled slowly on a hot plate over a period of 1 hour. Naphthalene was then dissolved out of each sample using separately as the solvent for naphthalene:
1. acetone
2. dichloromethane
3. dimethyl formamide
4. 1,1,1-trichloroethane.

The slowly-cooled sample rendered a uniform powder; and the rapidly quenched sample rendered a powder and a thin film of polyethylene terephthalate.

Example 9 (Polymer Recovery only)

A brown commercially available double knit polyester sample was dissolved at 10% polymer concentration in naphthalene, and the solution was poured (hot) into an excess of dimethyl formamide at 140° C, producing a dilute slurry of white polyester in a colored solution. The slurry was allowed to cool and was thereafter filtered. The solids were rinsed twice with dimethyl formamide, and then with water. After drying, the granular solids were an off-white color.

Example 10 (Polymer Recovery)

The same hot polyester naphthalene solution was poured into an excess of dimethyl formamide at room temperature, then filtered and rinsed with dimethyl formamide and water. After drying, the powdery solid was white.

Example 11 (Dye Stripping and Polymer Recovery)

The same brown double knit polyester sample used in Example 9 was subjected to a naphthalene countercurrent dye stripping, generally as described in paragraph No. 5 above, at a temperature of 165° C. The dye stripped sample, while wet, was dissolved at a 10% polymer concentration in naphthalene, and the solution was poured (hot) into an excess of dimethyl formamide at 140° C, producing a dilute slurry of white polyester in a colored solution (the coloring being from residual dye). The slurry was allowed to cool and filtered, and the solids were rinsed twice with dimethyl formamide, and then with water. After drying, the granular solids, unlike the products of Examples 9 and 10, were white in color, and generally characteristic of the commercial delustered polymer prepared for spinning.

Example 12 (Polymer Recovery only)

The process of Example 9 was repeated using acetone at room temperature in place of dimethylformamide at 140° C. A white polyester product with intrinsic viscosity of 0.61 and melting temperature of 256° C was obtained.

Example 13 (Polymer Recovery only)

The process of Example 12 was repeated, using in place of naphthalene the following solvents for polyester. Properties of polyesters are shown:

|  | Melting Point | Intrinsic viscosity |  |
|---|---|---|---|
| Diphenylmethane | 256 | 0.5332 | White Product |
| Phenanthrene | 250 | 0.5144 | Off-White Product |
| Acenaphthene | 254 | 0.5436 | |

The above polymer recovery examples show that at polymer concentrations in the primary dissolution solvent of the order of 10% or less it is possible to obtain a reasonably effective dye removal without the initial dye stripping step. As to be expected, however, variations of dye concentrations and characteristics may affect the result. Where the combination of dye stripping and polymer recovery is employed, significantly higher dye concentrations and/or polymer concentrations have been found to be employable with excellent results.

EXAMPLE 14 (DYE STRIPPING AND POLYMER RECOVERY)

The same brown double knit sample as used in Examples 9 – 11 was subjected to a one stage prewash in naphthalene at 165° C and thereafter dissolved in naphthalene at 195° C at a 20% concentration of the polymer. The solution was poured hot into an excess of dimethyl formamide at room temperature producing a slurry in a colored solution. The slurry was allowed to cool, was thereafter filtered; and, thereafter rinsed twice with dimethyl formamide and water. The result was an off-white or oyster-colored crumb. The above procedure was repeated except that the prewash was omitted. The resulting polymer recovered was pink in color.

Having thus described our invention and several embodiments thereof, what we desire to claim and secure by Letters Patent is:

1. A process for recovery and reuse of dyed polyester fibers comprising stripping the dye from said fibers by:
   1. contacting said fibers with a dye stripping solvent for said fibers at a temperature below which said fibers dissolve and above which the crystalline lattice of the polyester fibers swell so as to release the dye;
   2. removing the excess of the dye-containing dye stripping solvent which is not absorbed by said fibers;
   3. contacting the residual dye-containing dye stripping solvent-laden fibers with sufficient addition of a primary dissolution solvent under dissolution conditions for said fibers;
   4. precipitating the polyester out of solution; and,
   5. separating the precipitated polymer from the solvent.

2. The process of claim 1 wherein the dye stripping solvent is compatible with said primary dissolution solvent.

3. The process of claim 1 wherein the dye stripping solvent is the same as the primary dissolution solvent.

4. The process of claim 1 wherein the primary dissolution solvent includes a compound selected from the group consisting of: para-chloroanisole; dichloromethane; nitrobenzene; 1,1,1 trichloroethane; acetophenone; trichloroacetic acid; propylene carbonate; dimethyl sulfoxide; 1,1,2,2 tetrachloroethane; 2,6-dimethyl phenol; quinoline; 1,1,1,3,3,3 hexafluoro-isopropanol; ethylene carbonate; naphthalene; propylene carbonate; meta-cresol; chloroform; phenol; carbon tetrachloride; tetrahydronaphthalene; ortho-phenylphenol; para-phenylphenol; trifluoroacetic acid; ortho-chlorophenol; trichlorophenol; diphenyl; diphenyl ether; methyl naphthalene; benzophenone; diphenyl methane; dimethyl formamide; benzyl alcohol, para-dichlorobenzene; acenaphthene; and phenanthrene.

5. The process of claim 1 wherein the primary dissolution solvent is selected from the group consisting of: a mixture of benzyl alcohol and ethylene glycol; a mixture of dichloromethane and trichloroacetic acid; a mixture of naphthalene and benzyl alcohol; a mixture of trichloroacetic acid and 1,1,1 trichloroethane; a mixture of trichloroacetic acid and water; a mixture of trichlorophenol and phenol; a mixture of 1,1,2,2 tetrachloroethane and phenol; a mixture of 1,2,2 trifluoroethane and 1,1,1,3,3,3 hexafluoro-isopropanol; para-chloroanisole; nitrobenzene; acetophenone; propylene carbonate; dimethyl sulfoxide; 2,6 dimethyl phenol; quinoline; naphthalene; meta-cresol; phenol; tetrahydronaphthalene; ortho-phenylphenol; para-phenylphenol; trifluoroacetic acid; ortho-chlorophenol; trichlorophenol; diphenyl; diphenyl ether; methyl naphthalene; benzophenone; diphenyl methane; dimethyl formamide; benzyl alcohol; para-dichlorobenzene; acenaphthene; and phenanthrene.

6. The process of claim 1 wherein the primary dissolution solvent is a solvent characterized by at least one unsaturated ring.

7. The process of claim 1 wherein the primary dissolution solvent is selected from the group consisting of naphthalene, diphenyl, diphenyl ether, methyl naphthalene, benzophenone, diphenyl methane, phenanthrene, acenaphthene and paradichlorobenzene.

8. The process of claim 6 wherein the primary dissolution solvent is naphthalene.

9. The process of claim 1, wherein the polyester is precipitated out of solution by exposing the solution to a quenching medium which medium is a solvent for primary dissolution solvent.

10. The process of claim 9 wherein the quenching medium is selected from the group consisting of 1,1,1 trichloroethane, acetone, dichloromethane, and dimethyl formamide.

11. The process of claim 9 wherein the quenching medium is dimethyl formamide.

12. The process of Claim 6 wherein the quenching medium is water.

* * * * *